(12) United States Patent
Sadinski

(10) Patent No.: US 7,150,614 B2
(45) Date of Patent: Dec. 19, 2006

(54) HORIZONTAL VACUUM CHAMBER SEAL CONTROL DEVICE

(75) Inventor: Robert L. Sadinski, Tallmadge, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 418 days.

(21) Appl. No.: 10/739,360

(22) Filed: Dec. 18, 2003

(65) Prior Publication Data

US 2005/0133944 A1    Jun. 23, 2005

(51) Int. Cl.
B29C 44/60    (2006.01)
B29C 47/16    (2006.01)
B29C 47/92    (2006.01)

(52) U.S. Cl. .......................... 425/4 C; 425/71; 425/73; 425/145; 425/325; 425/387.1; 425/466; 425/817 C

(58) Field of Classification Search ................. 425/71, 425/73, 145, 325, 387.1, 4 C, 817 C, 466
See application file for complete search history.

(56) References Cited

U.S. PATENT DOCUMENTS

| | | | |
|---|---|---|---|
| 3,912,436 A | * | 10/1975 | Bailly .................... 425/327 |
| 4,044,084 A | | 8/1977 | Phipps |
| 4,199,310 A | | 4/1980 | Phipps |
| 4,247,276 A | | 1/1981 | Phipps |
| 4,271,107 A | | 6/1981 | Phipps |
| 4,783,291 A | | 11/1988 | Pagan |
| 5,676,893 A | * | 10/1997 | Cree .................... 264/40.1 |
| 5,753,161 A | | 5/1998 | Lightle et al. |
| 5,783,122 A | | 7/1998 | Sadinski |
| 6,036,468 A | | 3/2000 | Sadinski |
| 6,093,350 A | | 7/2000 | Sadinski |
| 6,113,374 A | | 9/2000 | Brackman et al. |
| 6,116,882 A | | 9/2000 | Sadinski et al. |
| 6,213,752 B1 | | 4/2001 | Sadinski |
| 6,403,016 B1 | | 6/2002 | Sadinski |

FOREIGN PATENT DOCUMENTS

EP     0 260 948     3/1988

* cited by examiner

*Primary Examiner*—Allan R. Kuhns
(74) *Attorney, Agent, or Firm*—Inger H. Eckert; Maria C. Gasaway

(57) ABSTRACT

Disclosed is an apparatus and a corresponding method for producing a continuous foamed extrudate product in which the extrusion and initial expansion of the foamed extrudate is conducted within a chamber under a partial vacuum. The foamed extrudate is then removed from the chamber through an orifice submerged within a liquid baffle. The dimensions of the foamed extrudate are monitored as it approaches the orifice and, if necessary, the effective sizing of the orifice is adjusted through the movement of a pair of side gates and a single vertical gate arranged external the orifice to match opening to the foamed extrudate and impede the flow of liquid into the chamber through the orifice.

9 Claims, 5 Drawing Sheets

HORIZONTAL VACUUM CHAMBER SEAL CONTROL DEVICE

TECHNICAL FIELD AND INDUSTRIAL APPLICABILITY

The present invention is directed to an improved apparatus for the manufacture of polymeric foams using a horizontal vacuum chamber sealed with a liquid baffle and more particularly to an apparatus providing both a simplified structure and improved seal control over the vacuum chamber exit opening.

BACKGROUND OF THE INVENTION

A variety of manufacturing equipment have been utilized in the production of low density extruded polymeric foam materials. Many conventional manufacturing systems include a foam extrusion system having a horizontal vacuum chamber with an extrusion die positioned at one end of the vacuum chamber and an exit opening arranged at the opposite end of the vacuum chamber with a liquid baffle, typically water, used to seal the vacuum chamber. Other mechanisms may be included within the vacuum chamber for the formation and transport of the foam including, for example an extrusion die, sizing and measuring devices and rollers and/or other conveyors for directing the foam extrudate from the extrusion die, below the surface of the liquid baffle and through the exit opening.

The production of high quality, low density polystyrene foam board sold under the well known color PINK® and FOAMULAR® trademarks by Owens Corning of Toledo, Ohio, USA, has been accomplished using such inclined barometric leg vacuum extrusion lines. As noted above, a die is typically positioned within an upper portion of the vacuum chamber, along with shaping, tractor and/or calibration equipment to form and shape the foam extrudate that is then submerged in a pond and removed from the vacuum chamber through a submerged orifice into an atmospheric portion of the pond. The foam extrudate, which may be cooled by a combination of cooling air zones within the vacuum chamber and throughout the entire process length as well as its passage through the pond, may then be withdrawn from the pond for additional processing and/or cutting to commercial sizes. Such installations, however, are mechanically complex and, as a result, tend to be both costly and difficult to operate, particularly since the upper portion of the chamber may be a number of meters above and a substantial distance horizontally removed from the lower portion.

One such apparatus is disclosed in Pagan's U.S. Pat. No. 4,783,291 in which the liquid baffle included a pond of liquid that is maintained at a higher level within the vacuum chamber and at a lower level outside the chamber. The level of the liquid baffle within the vacuum chamber is formed between a dam plate and a seal plate arranged at the exit end of the vacuum chamber. As disclosed by Pagan, the seal plate includes a size adjustable window through which the foam extrudate passes as it is guided by a conveyor downwardly into the internal section of the pond, through an orifice provided in the seal plate or bulkhead and then upwardly through the external section of the pond using a conveyor that includes a large radius curved section.

Pagan also disclosed controlling the level of liquid in the vacuum chamber by circulating liquid from the internal section to the external section of the pond, with the amount of liquid circulated being inversely proportional to the absolute pressure maintained within the vacuum chamber. The sizing of the orifice through which the extrudate exits the vacuum chamber is controlled by a movable shutter arranged above the orifice and positioned in response to vacuum level. In this manner the shutter acts as a gross flow control valve for water tending to move from the atmospheric section of the pond into the vacuum section of the pond.

Another apparatus is disclosed in Lightle et al.'s U.S. Pat. No. 5,753,161 which disclosed a horizontal vacuum extrusion line including a fixed bulkhead, a die inside the bulkhead, a telescoping vacuum chamber section and a fixed chamber section. A dam was provided in the fixed chamber section to form a pond for immersion cooling of the extrudate. A truss was provided within the vacuum chamber and extended from the dam to the bulkhead and extending through the telescoping vacuum chamber section for supporting shaping and calibration equipment.

As disclosed in Lightle, the apparatus included fluid pressurizable seals arranged at each end of the telescoping vacuum section that were operable after the telescoping section is closed against the bulkhead and the telescoping and fixed sections are locked together. The use of the telescoping vacuum section allowed the construction of a more compact line and improved access to equipment arranged downstream of the extrusion die.

The extrudate from the die is directed down into the pond and then through an orifice in a hood projecting from the chamber into a lower level portion of the pond that extends outside of the vacuum chamber. The hood also included a tractor drive for pushing the extrudate through the underwater orifice and a means for controlling the higher level of the pond within the vacuum chamber downstream of the dam.

Another apparatus was disclosed in Sadinski's U.S. Pat. No. 6,116,882, which disclosed an extrusion system that could include single or tandem extruders and a mixer-cooler to extrude a foamable extrudate through a die arranged in a vacuum chamber. The mixer-cooler is utilized to achieve a narrow range of melt viscosity of the melt before the melt is extruded through the die. The extrudate was then shaped and calibrated within the vacuum chamber to produce a low density foamed product.

The extrudate is then removed from the vacuum chamber on a continuous basis through an orifice that is submerged in a water baffle immersion seal. The extrudate is directed to the submerged orifice with a free wheeling guiding system arranged upstream of the orifice with the configuration of the orifice continually adjusted to compensate for variations in the sizing of the extrudate. Before the extrudate passes into the water baffle seal it moves over a floating dancer roll, the position of which controls a haul-off device such as a vacuum belt arranged downstream of the orifice to avoid the need to push or otherwise drive the extrudate within the vacuum chamber.

Another apparatus was disclosed in Sadinski's U.S. Pat. No. 6,213,752, which disclosed a vacuum extrusion line that incorporated a vacuum chamber having an extrusion die at one end and a water baffle immersion cooler at the other end for extracting the extrudate to atmosphere. The vacuum chamber further included extrudate shaping and sizing equipment arranged downstream of the die, a large diameter fixed bulkhead, two large diameter movable sections surrounding the shaping and sizing equipment and a smaller fixed section of the chamber.

The position of both the first and second moveable sections may be adjusted to seal against the fixed section and/or the fixed bulkhead and complete the vacuum chamber or moved to open an access gap to aid in the servicing of the downstream equipment with a simplified lock mechanism that facilitates the opening and closing of the vacuum chamber.

BRIEF SUMMARY OF THE INVENTION

Disclosed is an apparatus for producing a continuous foamed extrudate product comprising a vacuum chamber, the vacuum chamber containing an extruder for forming an extrudate, an internal liquid reservoir for forming a liquid baffle, a bulkhead partially submerged within the internal liquid reservoir and an orifice submerged within the internal liquid reservoir and providing a fluid connection to an external liquid reservoir. The liquid levels in the two reservoirs will be maintained so that at all times during the production of the foamed extrudate the orifice will be completely submerged in the baffle liquid. Also included in the apparatus will be conveying and tractor means for guiding the extrudate from the extruder into the internal liquid reservoir, through the orifice and into the external liquid reservoir, the conveying means preferably arranged so that the foamed extrudate passes through the orifice with an orientation substantially perpendicular to the bulkhead. Arranged outside the vacuum chamber and adjacent the orifice will be a pair of side gate assemblies operable for controlling the effective width and horizontal positioning of the orifice, a roller assembly arranged adjacent and external to the side gate assemblies for defining a effective lower surface of the orifice, and a vertical gate assembly operable for controlling, in cooperation with the roller assembly, the effective height of the orifice.

Each of the side gate assemblies will typically includes a side gate, the side gate being moveable forwardly and backwardly along a first axis that is inclined relative to a major surface of the foam product. The vertical gate assembly will typically include a vertical gate, the vertical gate being moveable along a second axis perpendicular to the major surface of the foam product.

The side gate assemblies will also typically include a track assembly arranged on or adjacent an external surface of the bulkhead and parallel to the first axis along which the side gate will move to at least partially contain and guide the side gate, a reversible motor that is mechanically linked to the side gate and operable for extending and retracting the side gate along the track assembly, and motor controller for determining the direction, speed and duration of movement of the reversible motor in response to measurements of the foamed extrudate.

The vertical gate assemblies will typically include a second track assembly arranged adjacent the first track assembly for at least partially containing and guiding the vertical gate, at least one reversible motor that is mechanically linked to portion of the vertical gate and operable to extend and retract the vertical gate along the second track assembly. Other possible configurations include a single reversible motor that is mechanically linked to opposite outward portions of the vertical gate and operable to extend and retract the vertical gate along the second track assembly and a pair of synchronized reversible motors that are separately mechanically linked to portions of the vertical gate. The reversible motor or motors will typically linked to at least one motor controller for determining the direction, speed and duration of movement of the reversible motor(s) in response to measurements of the foamed extrudate or other measured, stored or input data. The apparatus will also include one or more devices for measuring the dimensions of the foamed extrudate before it enters the orifice, the measurements preferably being taken with the foamed extrudate in an orientation substantially perpendicular to the plane defined by the bulkhead and a means for transmitting one or more signals generated by the measurement means to the motor controllers, the signals corresponding to the dimensional measurements of the foamed extrudate so that the side and vertical gate positioning may be adjusted accordingly.

The disclosed apparatus may be utilized in a method for forming a continuous, low density foam product by forming a polymeric melt including a blowing agent, extruding the polymeric melt through a die into a chamber, the chamber preferably being maintained at a pressure below atmospheric pressure, to form a foamed extrudate, conveying the foamed extrudate below the surface of a liquid baffle maintained within the chamber and through an orifice provided in the chamber and into a liquid baffle maintained outside the chamber. As the foamed extrudate approaches the orifice it will be measured and the positioning of the pair of side gates and the vertical gate adjusted to form an effective orifice opening corresponding closely to the dimensions and horizontal positioning of the foamed extrudate. The active sealing of the orifice reduces the likelihood of damage to the foamed extrudate while also impeding the flow of liquid into the chamber through the orifice.

BRIEF DESCRIPTION OF THE DRAWINGS

The above and other features and advantages of the present invention will become more apparent by describing in detail preferred embodiments thereof with reference to the attached drawings in which.

These figures are for the purpose of illustration only and are not, therefore, drawn to scale. The relative sizing and orientation of the various structural elements may have been exaggerated, simplified and/or otherwise modified to improve the clarity of the drawings with respect to the written description and should not be interpreted as unduly limiting the scope of the invention.

DETAILED DESCRIPTION OF EXEMPLARY EMBODIMENTS

Figure 1:
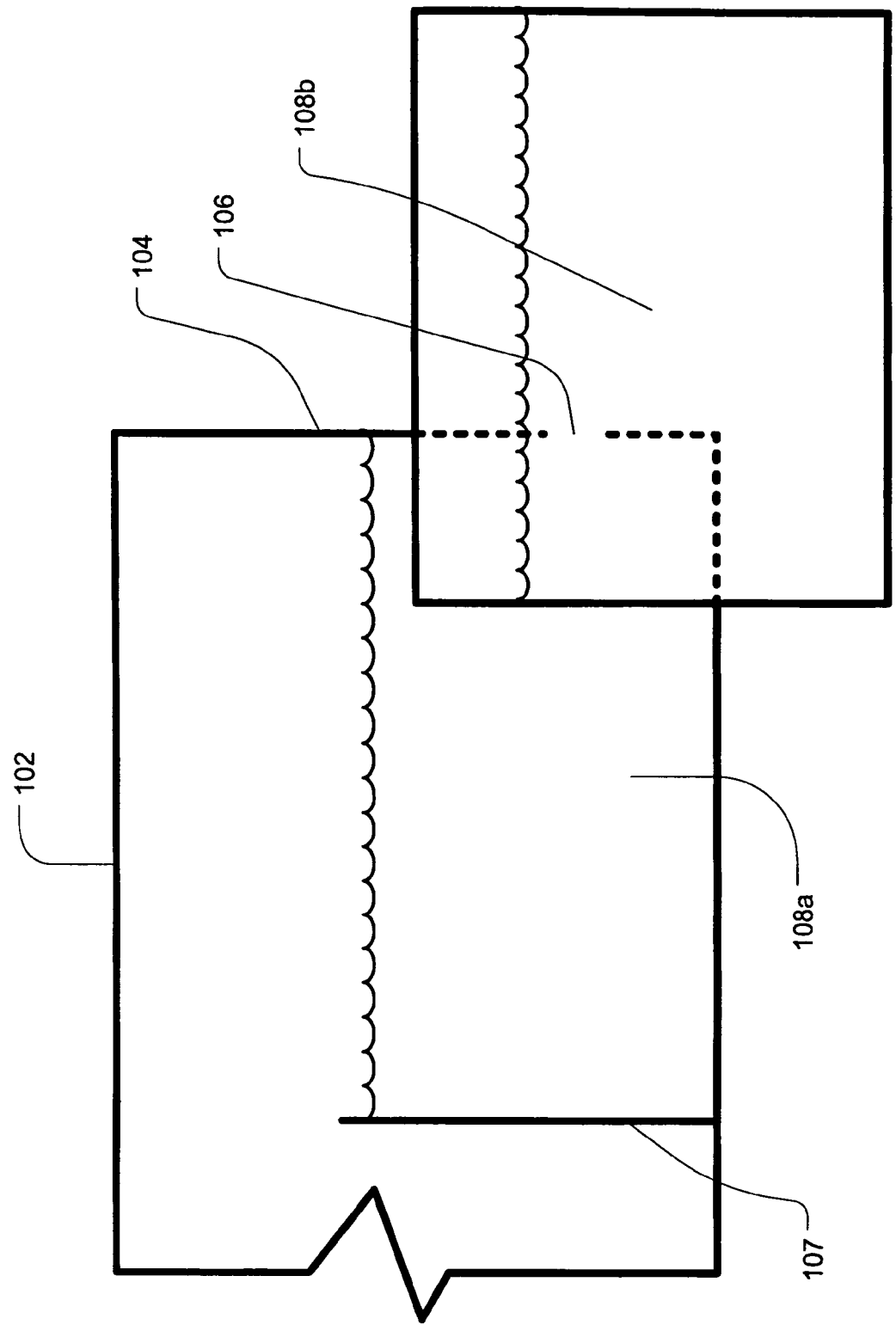
FIG. 1 illustrates a cross-sectional view of the downstream end of a vacuum chamber and a portion of an external reservoir according to an exemplary embodiment of the invention.
Figure 2:
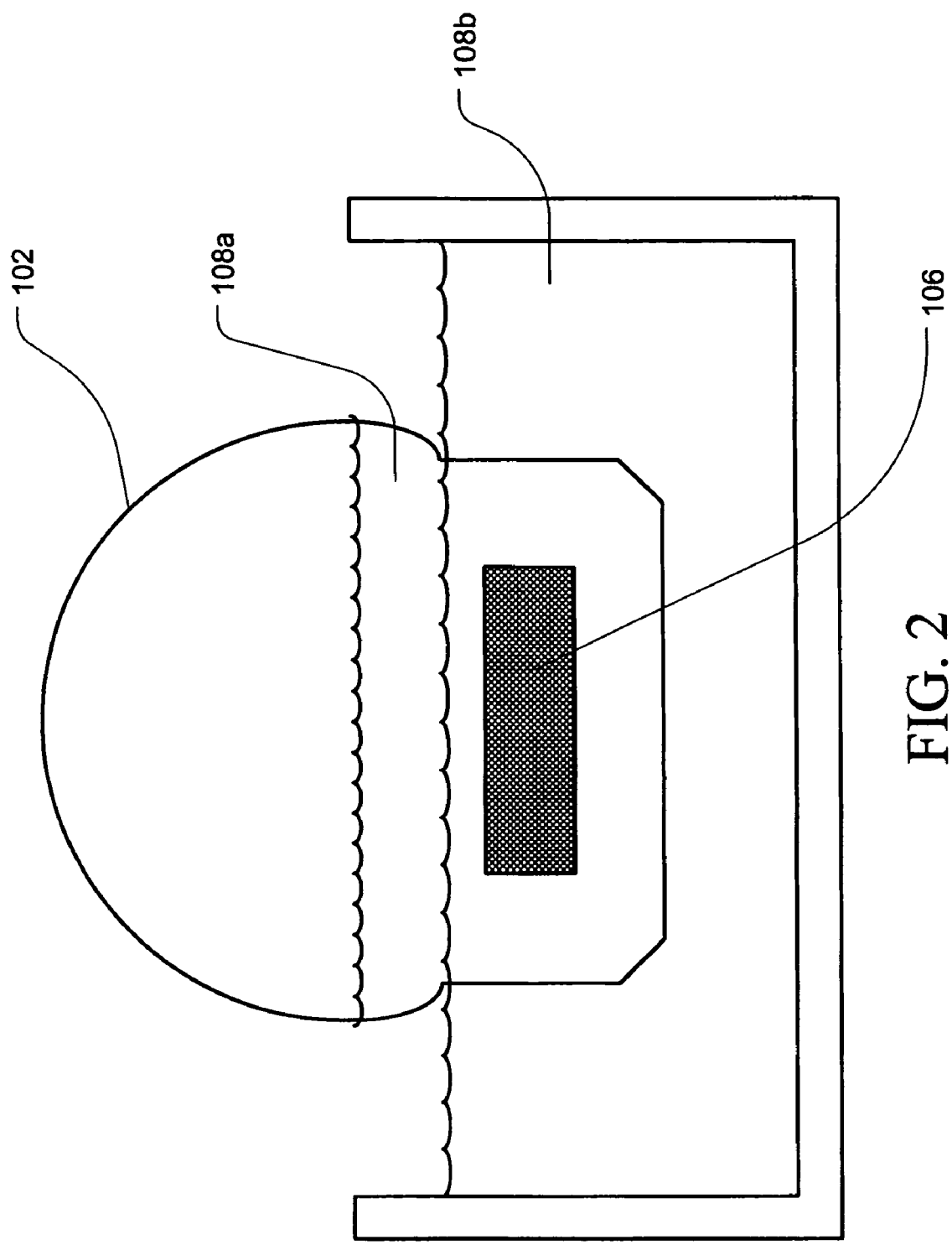
FIG. 2 illustrates a frontal view of the vacuum chamber and the external reservoir illustrated in FIG. 1.

As illustrated in FIG. 1, exemplary embodiments of the apparatus include a vacuum chamber 102 terminating in a bulkhead 104 having an opening, window or orifice 106 that opens from an internal reservoir 108*a* arranged within the vacuum chamber into an external reservoir 108*b* maintained under atmospheric pressure. Both the internal reservoir 108*a* and the external reservoir 108b include a liquid baffle, typically water, that is maintained at levels sufficient to cover the orifice 106 completely with or without a vacuum applied in the vacuum chamber.

As will be appreciated, the application of reduced pressure within the vacuum chamber will tend to increase the level of the liquid within the internal reservoir, with a corresponding decrease in the level of the liquid within the external reservoir, as the liquid is drawn into the internal reservoir through the orifice. The relative volumes of the two reservoirs, as well as the pressure differential and the action of other devices such as pumps, valves and level controllers may be selected so that the change in the levels of the liquid within the two reservoirs is controlled to a degree that the orifice remains completely submerged under all expected operational conditions and that the liquid does not overflow into other portions of the vacuum chamber or onto the factory floor.

The liquid baffle level may be maintained by a system of level controllers, pumps and valves that will tend to remove liquid from the internal reservoir 108a and return it to the external reservoir 108b. As detailed in the references discussed above, and incorporated herein in their entirety, by reference, a range of equipment including, for example, extruders, dies, shapers, sizers, conveyors, measurement devices, dams and struts may be positioned within the vacuum chamber 102 upstream of the illustrated orifice 106.

Similarly, the upstream portion of the vacuum chamber 102 may include multiple cooperating elements (not shown) of similar or varying sizing intended both to enclose the foam product formation and processing equipment and to provide improved maintenance access. Additional equipment (not shown) such as level controllers, pumps, valves and heat exchangers may be provided for controlling the temperature and/or the respective liquid levels maintained within the vacuum chamber and/or the external reservoir.

The extrudate may be formed from recycled and/or virgin polymeric material and may further include additives such as fire retardants, colorants, fillers, reinforcing fibers, ultraviolet stabilizers and blowing agents. A melt comprising the desired components is prepared and then typically extruded through a die and/or shaper (not shown) to produce a continuous and generally flat panel or board shape that is calibrated and controlled to within a predetermined range of thickness and flatness. By extruding the melt under vacuum, the degree of expansion of the extrudate may be increased to obtain low density foam products.

Figure 5:
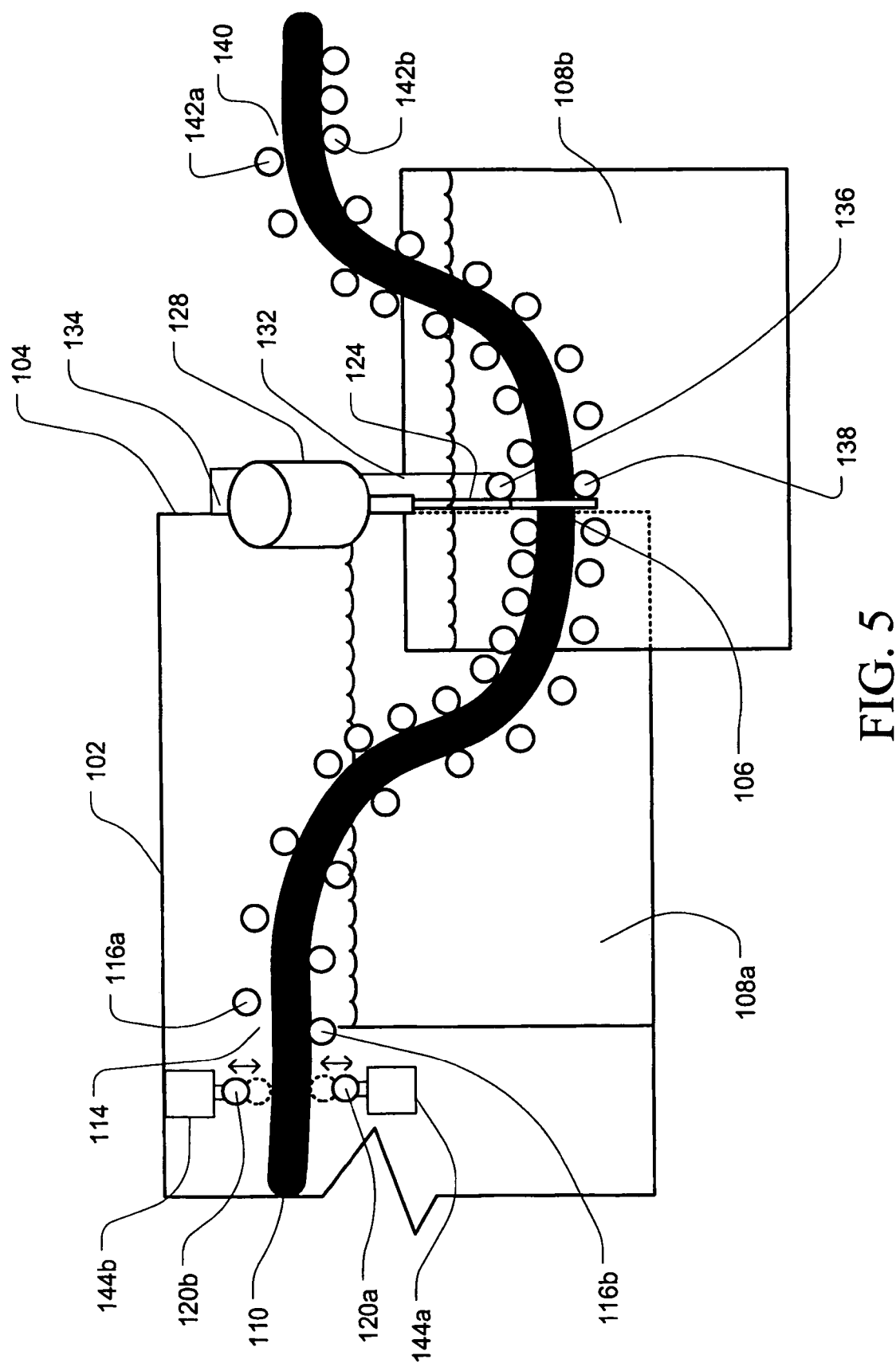
FIG. 5 illustrates a cross-sectional view of the flow of an extrudate through the downstream portion of the vacuum chamber, through an orifice submerged in a liquid baffle, and through the external reservoir.

As illustrated in FIG. 5, the extrudate 110, after passing through the shaping, forming and measuring devices (not shown) is advanced over a roller 120a, which may be fixed or may provide for a range of vertical movement and into a channel 114 defined between a plurality of upper 116a and lower 116b roller conveyors that serve to guide the extrudate into the internal reservoir 108a maintained within the vacuum chamber 102. Arranged above the roller 120a may be another roller 120b, either fixed or moveable, that may be used, in combination with roller 120a, for contacting and driving the extrudate 110 during a start-up sequence in order to advance the extrudate through the roller conveyors 116a, 116b. Depending on, for example, the size and consistency of the extrudate 110, the length of the channel 114 and buoyancy or frictional forces that would tend to impede the progress of the extrudate through the channel, one or both of the rollers 120a, 120b may be driven and may be positioned and/or provided with surface features that will tend to increase their ability to advance the extrudate. However, once the lead portion of the extrudate 110 sheet or panel has exited the vacuum chamber 102 and is engaged by a downstream tractor mechanism (not shown), one or both of the rollers 120a, 120b may be withdrawn and/or otherwise disengaged from the surface of the extrudate or may remain in contact but configured to rotate freely and serve as additional roller conveyors.

After the extrudate passes over the roller 112, it is guided downwardly into the channel 114 defined between the roller conveyors 116a, 116b. Given the tendency of the extrudate to float, the submerged portions of the upper roller conveyors 116a will typically include a larger number of more closely spaced rollers than those provided on the lower roller conveyors 116b. The various rollers incorporated within the roller conveyors are typically positioned and mounted so that the extrudate is deflected gradually downwardly into the upper portion of the internal reservoir 108a maintained in the downstream portion of the vacuum chamber 102.

The internal reservoir may be defined by the sides of the vacuum chamber 102, the bulkhead 104 and other retaining structures or dams 107 arranged within the vacuum chamber. The channel 114 typically provides a gradually curving path that may be followed by the extrudate 110 without tending to bind or kink that extends down into the internal reservoir 108a. Following the channel 114 the extrudate 110 will be fully immersed in the liquid maintained in the internal reservoir 108a and will be guided to and through the orifice 106 provided in the bulkhead 104. The channel 114 will preferably be configured to ensure that the extrudate 110 approaches and passes into the orifice 106 in a direction generally normal or perpendicular to the bulkhead.

When the pressure in the vacuum chamber 102 is reduced, liquid from the external reservoir 108b will tend to be drawn through the orifice 106 and into the internal reservoir 108a. During manufacturing operation, a major portion of the opening area of orifice 106 will be obstructed by the passage of the extrudate 110 through the orifice. The orifice 106 is, however, typically sized so that the extrudate 110 alone will be insufficient to prevent a significant flow of liquid from the external reservoir 108b into the internal reservoir 108a.

Figure 3:
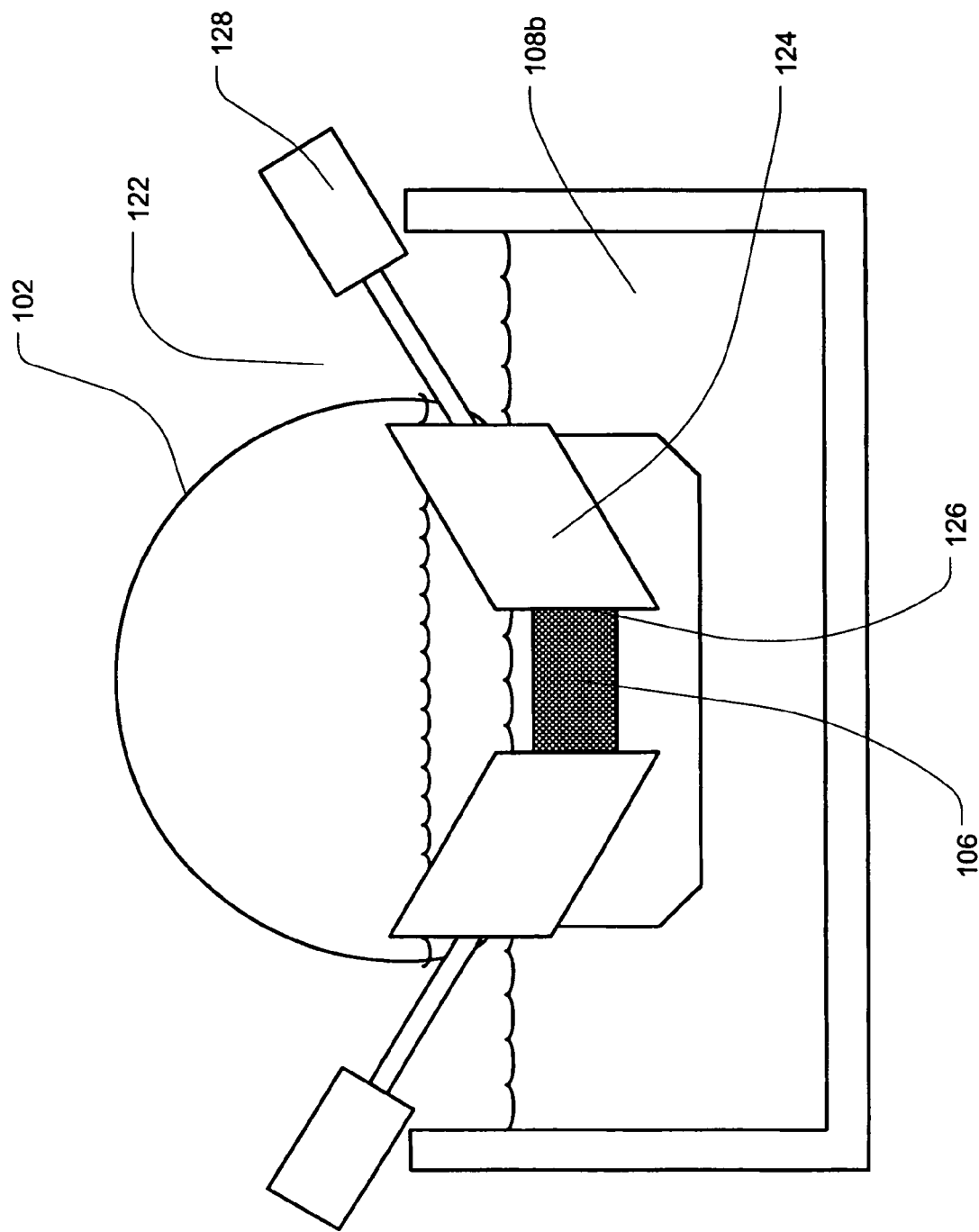
FIG. 3 illustrates the installation of side gate assemblies used for controlling the effective width of the submerged orifice in exemplary embodiments of the invention.

As illustrated in FIG. 3, in order to reduce the effective area of the orifice 106, a pair of side gate assemblies 122 may be arranged symmetrically on opposite sides of the orifice for controlling the effective width of the opening into the external reservoir 108b. Each side gate assembly 122 includes a lateral shutter or gate 124 having a leading edge 126 that will be positioned adjacent a minor surface of the extrudate 110 exiting the orifice 106. The leading edge 126 of the gate 124 may be rounded, tapered or otherwise modified to guide the extrudate 110 and/or reduce damage to the extrudate resulting from contact with the gate.

The gates 124 may be mounted on parallel tracks (not shown) to guide the movement of the gates and maintain a close spacing between the gates and an exterior surface of the bulkhead 104. The tracks and the movement of the gates 124 may be inclined with respect to a major surface of the extrudate, preferably at an angle between about 30° and 45° and may move independently or in a synchronized fashion to adjust the effective width of the orifice 106. The side gate assemblies 122 may be mounted to the vacuum chamber, the external reservoir or other structure using a suitable bracket or fixture (not shown) for supporting the assembly and maintaining the orientation with respect to the orifice 106.

The side gate assemblies 122 may include reversible motors 128 or other pneumatic, hydraulic or electric actuating means for adjusting the position of the side gates 124. When using reversible motors 128 as the actuating means, the motors may be configured to drive screw actuators that are, in turn, mechanically linked to the side gates 124. Similarly, when employing a pneumatic actuator, a piston rod driven by the pneumatic cylinder would be mechanically linked to the side gates 124 for adjusting the position of the side gates.

Figure 4:
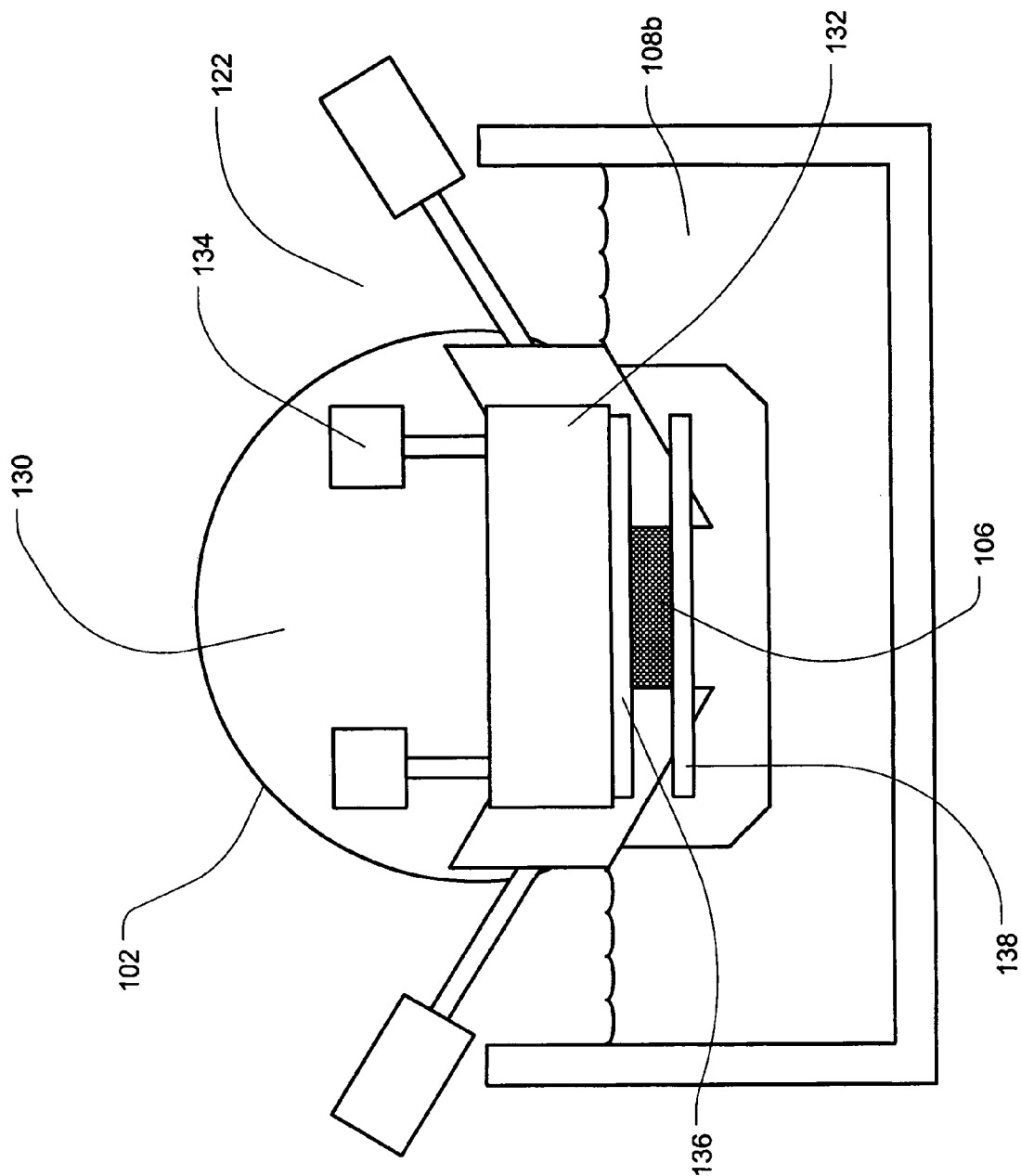
FIG. 4 illustrates the installation of a vertical gate assembly used for controlling the effective height of the submerged orifice in exemplary embodiments of the invention.

As illustrated in FIG. 4, positioned adjacent the side gates 124 will be a vertical gate assembly 130 including a vertical gate 132 that may be moved and positioned by a pair of actuators 134, preferably two synchronous drive servos, to define the effective upper limit of the orifice 106 opening. Although herein illustrated with two actuators, those of ordinary skill in the art will appreciate that the vertical gate 132 may also be moved and positioned using a single actuator that is mechanically linked to one or more attachment locations on the vertical gate through a combination of shafts, gears or other transmission components or, indeed, may be moved and positioned by three or more actuators. In any event, the combination of actuator(s) and mechanical linkage(s) used to move and position the vertical gate 132 are preferably selected and arranged to provide smooth, controlled movement of the vertical gate along a vertical axis. The vertical gate 132 may include a roller 136 or other suitable structure on its lower edge for the purpose of guiding the extrudate 110 while reducing or eliminating damage to its major surface. The vertical gate will preferably cooperate with a roller 138 or other suitable structure to define the effective height of the orifice 106. One or both of the surfaces of rollers 136, 138 may be selected from stainless steel, galvanized metal and polymeric materials such as urethane as desired.

The positioning of the side gates 124 and the vertical gate 132 may be continually adjusted in response to signals from edge sensing devices (not shown) or other measurement devices positioned generally adjacent the wetted surface of the bulkhead 104 to determine the dimensions of the extrudate 110 about to pass through the orifice 106. The positioning of the side gates 124 may involve movement of the side gates toward or away from each other to adjust the effective width of the orifice 106, movement of both side gates in a single direction to alter the horizontal positioning of the opening or a combination of both types of movement. This positioning scheme allows the side gates 124 to compensate for both variations in the sizing of the extrudate 110 and/or variations in the horizontal positioning of the extrudate within the channel 114 and the orifice 106. As noted above the roller conveyors 116a, 116b will preferably define a channel 114 that is oriented in a direction substantially normal to the surface of the bulkhead and may improve measurement accuracy.

In response to the signals received from the edge sensing devices, the current positioning of the side gates 124 and vertical gate 132 will be evaluated with regard to its suitability for the anticipated passage of extrudate 110. If the current positioning of the side gates 124 and the vertical gate 132 would result in an effective orifice opening that was too narrow or too thin, the appropriate actuators would be engaged to retract the side gates 124 and/or the vertical gate 132 to produce the desired orifice configuration. Conversely, if the current positioning of the side gates 124 and the vertical gate 132 would result in an effective orifice opening that was too wide or too thick, the appropriate actuators would be engaged to advance the side gates 124 and/or the vertical gate 132 to produce the desired orifice configuration. Similarly, if the current positioning of the side gates 124 would result in an effective orifice opening that is not correctly positioned to receive the extrudate, the appropriate actuators would be engaged to advance one of the side gates 124 while retracting the other side gate to relocate the effective opening without necessarily adjusting the effective width of the opening in any way.

The actuators 128 and 130 may be controlled by one or more motion controllers (not shown), preferably digital PID (proportional integral-derivative) type motion controllers that will may be used to correct for the difference in position between the internal dimensional sensors and the side gates 124 and vertical gate 132. The PID controllers may be configured to apply a programmed factor for delaying the positioning or repositioning of gates 124, 132 until the measured portion of the extrudate 110 on which the positioning will be based actually reaches the gates. These PID controllers may also be connected to the main process controls for increasing the degree of process control.

After the extrudate 110 clears the gates 124, 132 it will typically enter a channel 140 defined by another series of upper and lower roller conveyors 142a, 142b that will guide the extrudate upwardly through the external reservoir 108b and out of the baffle liquid. As the extrudate 110 emerges from the external reservoir 108b, it may pass through a blow-off operation (not shown) to reduce the amount of liquid carried forward with the extrudate. In a typical blow-off operation, jets of air or other gas are directed against the surfaces of the extrudate to remove excess moisture from the extrudate. From the blow-off operation, the extrudate 110 may contact a tractor device or other haul-off or conveying device (not shown) such as a vacuum conveyor that will tend to draw the extrudate from the external reservoir 108b.

With the tractor device (not shown) engaged and drawing a downstream portion of the extrudate 110, the channels 114, 140 through which the extrudate passes will preferably be defined entirely by non-driven or freely-rotating rollers. During operational start-up, however, a tractor device or driving device(s) 144a, 144b may be temporarily engaged to position and/or drive one or both of the rollers 120a, 120b for the purpose of advancing the extrudate 110 within the vacuum chamber 102 into channel 114 and through the orifice 106. Once the extrudate 110 has advanced through channels 114, 140 and has been engaged by a tractor device (not shown), the driving devices 144a, 144b and one or both of the rollers 120a, 120b become unnecessary and may be disengaged.

It is preferred that the apparatus be arranged so that during continuous operation there is no need to pull or push on the extrudate 110 at any point between the calibration equipment arranged within the vacuum chamber 102 and any haul-off or conveying device arranged downstream of the external reservoir 108b. The rollers utilized in the various roller conveyors 116a, 116b, 142a, 142b will typically be freely rotating and have a smooth metal surface such as stainless steel or galvanized steel. In some applications, however, one or more of the rollers may be provided with a textured surface or a contact surface of a polymeric material such as urethane as desired. The rollers defining the channels 114 and 140 will typically be spaced and arranged so that pressure applied to a surface of the extrudate 110 does not tend to deform or squeeze the extrudate to any significant degree. Sensor devices arranged within the vacuum chamber 102, such as a dancer roll arranged under the extrudate 110, may be employed to control the tension applied by the downstream tractor or other haul-off device(s) to reduce any elongation and associated thinning of the extrudate as it passes through the calibration equipment and orifice 106 and gates 124, 132.

As the extrudate 110 emerges from the tractor or other downstream haul-off device(s) (not shown), the extrudate may pass through a cutoff and trimming unit (not shown) that will cut the continuous extrudate into predetermined lengths and may also trim and/or treat the side surfaces of the extrudate. Scrap produced during the cutoff and trimming operation may be treated and recycled with the sized panels or boards between collected and packaged for storage and/or shipment. The sized panels or boards may also be subjected to further processing to form secondary products such as laminated panels or sandwich structures.

The apparatus as described above and illustrated in the accompanying FIGURES is suitable for use in the efficient production of high quality, low-density extruded foam products. While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for the production of a continuous foam product comprising:
   a vacuum chamber, the vacuum chamber including
      an extruder for forming an extrudate;
      an internal liquid reservoir having a first liquid level;
      a bulkhead partially submerged within the internal liquid reservoir;
   an external liquid reservoir having a second liquid level;
   an orifice formed in the bulkhead, the orifice located completely below both the first liquid level and the second liquid level, the orifice providing a connection between the internal liquid reservoir and the external liquid reservoir;
   conveying means for guiding the extrudate from the extruder into the internal liquid reservoir, through the orifice and into the external liquid reservoir, the extrudate passing through the orifice with an orientation substantially perpendicular to a plane defined by the bulkhead;
   a pair of side gate assemblies, the side gate assemblies arranged adjacent and external to the orifice, the side gate assemblies being operable for controlling the effective width and horizontal position of the orifice, wherein each side gate assembly includes a side gate, the side gate being moveable along a first axis inclined relative to a major surface of the foam product; and
   the vertical gate assembly includes a vertical gate, the vertical gate being moveable along a second axis substantially perpendicular to the major surface of the foam product, wherein each side gate assembly includes
      a track assembly, the track assembly being arranged on a external surface of the bulkhead, parallel to the first axis and at least partially containing the side gate;
      a reversible motor, the reversible motor being mechanically linked to the side gate for extending and retracting the side gate along the track assembly; and
      a first motor controller, the first motor controller determining the direction, speed and duration of movement of the reversible motor in response to measurements of the extrudate;
   a roller assembly arranged adjacent and external to the side gate assemblies for defining a effective lower surface of the orifice;
   a vertical gate assembly arranged adjacent and external to the side gate assemblies, the vertical gate assembly being operable for controlling, in cooperation with the roller assembly, the effective height of the orifice.

2. An apparatus for the production of a continuous foam product according to claim 1, wherein:
   the vertical gate assembly includes
      a second track assembly, the second track assembly at least partially containing the vertical gate;
      a pair of synchronized reversible motors, each reversible motor being mechanically linked to a peripheral portion of the vertical gate for extending and retracting the vertical gate along the second track assembly; and
      a second motor controller, the second motor controller determining the direction, speed and duration of movement of the reversible motors in response to measurements of the extrudate.

3. An apparatus for the production of a continuous foam product according to claim 1, wherein:
   the vertical gate assembly includes
      a second track assembly, the second track assembly at least partially containing the vertical gate;
      a reversible motor, the reversible motor being mechanically linked to a portion of the vertical gate for extending and retracting the vertical gate along the second track assembly; and
      a second motor controller, the second motor controller determining the direction, speed and duration of movement of the reversible motor in response to measurements of the extrudate.

4. An apparatus for the production of a continuous foam product according to claim 1, wherein:
   the vertical gate assembly includes
      a second track assembly, the second track assembly at least partially containing the vertical gate;
      a reversible motor, the reversible motor being mechanically linked to two peripheral portions of the vertical gate for extending and retracting the vertical gate along the second track assembly; and
      a second motor controller, the second motor controller determining the direction, speed and duration of movement of the reversible motor in response to measurements of the extrudate.

5. An apparatus for the production of a continuous foam product according to claim 4, further comprising:
   means for measuring the extrudate positioned adjacent an internal surface of the bulkhead for making width and height measurements of the extrudate before it enters the orifice, the measurements being taken with the extrudate in an orientation substantially perpendicular to the plane defined by the bulkhead; and
   means for transmitting one or more signals generated by the measurement means to the first and second motor controllers, the signals corresponding to the width and height measurements of the extrudate.

6. An apparatus for controlling the effective sizing of an orifice through which a material exits an enclosed chamber comprising:
   a bulkhead, the bulkhead defining a downstream limit of the enclosed chamber;
   an orifice arranged in the bulkhead;
   a pair of side gate assemblies, the side gate assemblies arranged adjacent and external to the orifice, the side gate assemblies being operable for controlling the effective width of the orifice, wherein each side gate assembly includes a track assembly, the track assembly being arranged on a external surface of the bulkhead, parallel to the firat axis and at least partially containing the side gate;

a reversible motor, the reversible motor being mechanically linked to the side gate for extending and retracting the side gate along the track assembly; and a first motor, controller the first motor controller determining the direction, speed and duration of movement of the reversible motor in response to measurements of the extrudate;

a roller assembly arranged adjacent and external to the side gate assemblies for defining a effective lower surface of the orifice;

a vertical gate assembly arranged adjacent and external to the side gate assemblies, the vertical gate assembly being operable for controlling, in cooperation with the roller assembly, the effective height of the orifice.

7. An apparatus for controlling the effective sizing of an orifice according to claim 6, wherein:

the vertical gate assembly includes a second track assembly, the second track assembly at least partially containing the vertical gate;

a pair of synchronized reversible motors, each reversible motor being mechanically linked to a peripheral portion of the vertical gate for extending and retracting the vertical gate along the second track assembly; and a second motor controller, the second motor controller determining the direction, speed and duration of movement of the reversible motors in response to measurements of the extrudate.

8. An apparatus for controlling the effective sizing of an orifice according to claim 6, wherein:

the vertical gate assembly includes a second track assembly, the second track assembly at least partially containing the vertical gate;

a reversible motor, the reversible motor being mechanically linked to two peripheral portions of the vertical gate for extending and retracting the vertical gate along the second track assembly; and a second motor controller, the second motor controller determining the direction, speed and duration of movement of the reversible motor in response to measurements of the extrudate.

9. n apparatus for controlling the effective sizing of an orifice according to claim 8, further comprising:

a single motor control unit incorporating both the first and second motor controllers;

means for measuring positioned within the enclosed chamber for making dimensional measurements of the material before it enters the orifice, the measurements being taken wit a main axis of the material in an orientation substantially perpendicular to a plane defined by the bulkhead; and transmission means for transmitting signals corresponding to the measurements of the material taken by the means for measuring to the motor control unit.

* * * * *